(12) United States Patent
Bettinger et al.

(10) Patent No.: US 11,931,663 B2
(45) Date of Patent: Mar. 19, 2024

(54) ACTIVE DAMPING SYSTEM FOR SUSPENDED RIDE SYSTEM

(71) Applicant: TAIT TOWERS MANUFACTURING, LLC, Lititz, PA (US)

(72) Inventors: Matthew Steven Bettinger, Pine Grove, PA (US); Nicholas James Bonsell, Lititz, PA (US); Andrew Phillips Mudie, Lititz, PA (US); Andrew John Penney, Lancaster, PA (US); James Fowler Shumway, Jr., Lancaster, PA (US); McLane Walker Snow, East Petersburg, PA (US)

(73) Assignee: TAIT TOWERS MANUFACTURING, LLC, Lititz, PA (US)

( * ) Notice: Subject to any disclaimer, the term of this patent is extended or adjusted under 35 U.S.C. 154(b) by 320 days.

(21) Appl. No.: 17/390,340

(22) Filed: Jul. 30, 2021

(65) Prior Publication Data
US 2023/0032506 A1  Feb. 2, 2023

(51) Int. Cl.
*A63G 31/14* (2006.01)
*F16F 9/50* (2006.01)
*F16M 13/02* (2006.01)
*A63G 31/00* (2006.01)
*A63G 31/16* (2006.01)
*F16F 9/02* (2006.01)

(52) U.S. Cl.
CPC ............... *A63G 31/14* (2013.01); *F16F 9/50* (2013.01); *F16M 13/02* (2013.01); *A63G 2031/002* (2013.01); *A63G 31/16* (2013.01); *F16F 9/0209* (2013.01); *F16F 2222/12* (2013.01); *F16F 2230/08* (2013.01); *F16F 2230/18* (2013.01)

(58) Field of Classification Search
CPC ........ A63G 31/02; A63G 31/08; A63G 31/14; F16F 9/50; F16F 9/46; F16F 9/48; F16M 13/02
USPC ......................................... 472/130, 131, 135
See application file for complete search history.

(56) References Cited

U.S. PATENT DOCUMENTS

| | | | |
|---|---|---|---|
| 4,850,896 A | 7/1989 | Smith et al. | |
| 5,421,783 A | 6/1995 | Kockelman et al. | |
| 5,980,256 A | 11/1999 | Carmein | |
| 8,005,570 B2 | 8/2011 | Gloden et al. | |
| 8,991,569 B1 * | 3/2015 | Lou | F16F 13/007 188/266.5 |
| 2003/0110148 A1 * | 6/2003 | Ulyanov | F16F 9/46 706/2 |
| 2004/0124049 A1 * | 7/2004 | St. Clair | B60N 2/505 188/266 |

(Continued)

*Primary Examiner* — Kien T Nguyen
(74) *Attorney, Agent, or Firm* — Saxton & Stump, LLC

(57) ABSTRACT

An automated damping system including a damping device arranged and disposed to provide variable resistance to a load. The variable resistance provides resistance values corresponding to a displacement position of the damping device. The system includes a damping profile generator that calculates a damping profile and a sensor is arranged and disposed to measure one or more damping affecting properties. The sensor provides the one or more damping affecting properties to the damping profile generator. The damping profile provides the variable resistance based upon the one or more damping affecting properties of the load.

17 Claims, 4 Drawing Sheets

(56) References Cited

U.S. PATENT DOCUMENTS

2013/0260906 A1\* 10/2013 Checketts .............. A63G 31/02
                                                        472/131
2016/0001190 A1   1/2016  Davis
2020/0023705 A1\* 1/2020  Hirao ................ B60G 17/0182

\* cited by examiner

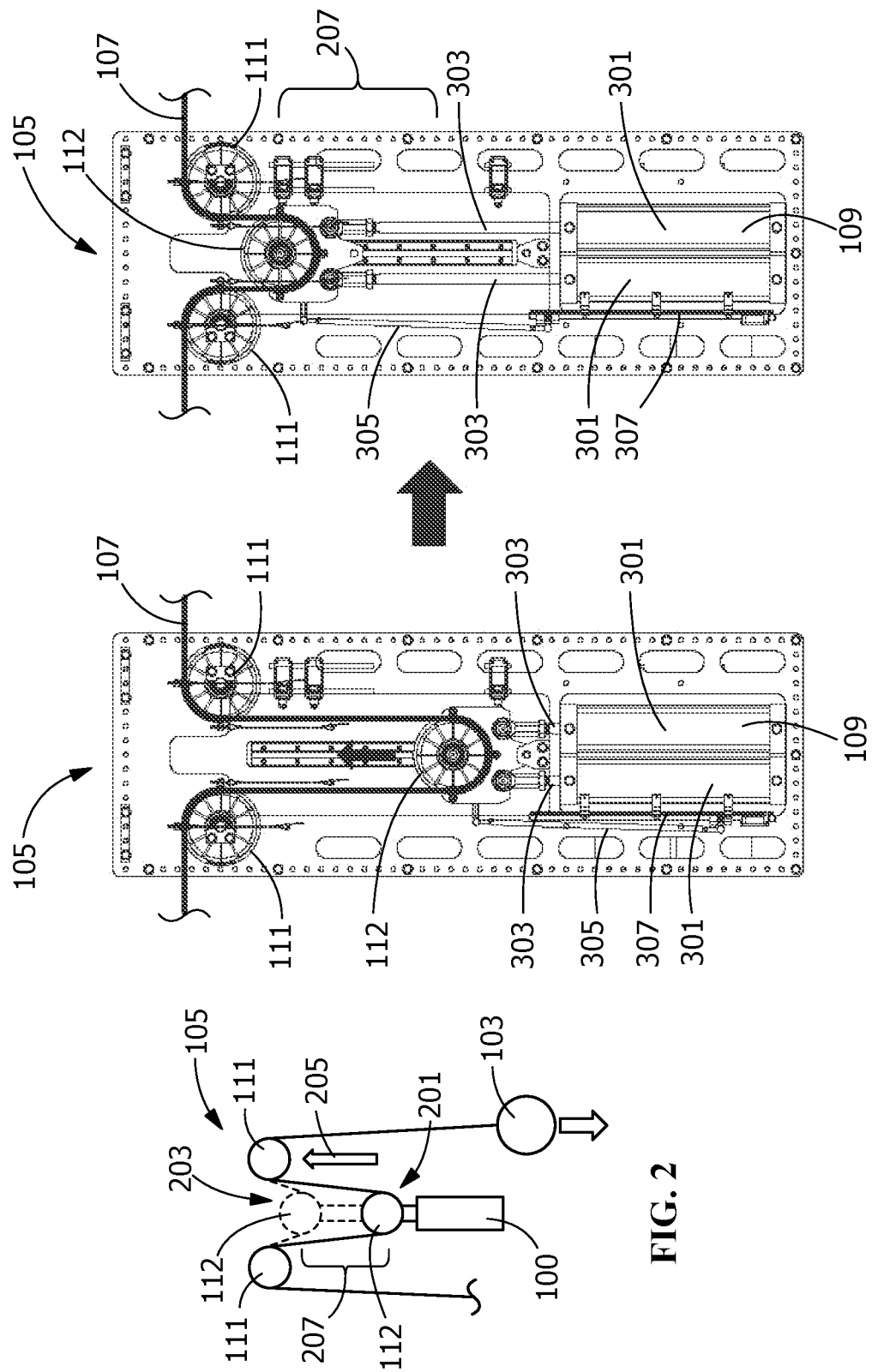

ACTIVE DAMPING SYSTEM FOR SUSPENDED RIDE SYSTEM

FIELD OF THE INVENTION

The disclosure is generally related to a damping system for entertainment or amusement ride systems. More particularly, the disclosure includes a damping system for providing a customized damping and sensory experience for suspended entertainment or amusement apparatuses.

BACKGROUND OF THE INVENTION

Known virtual reality and amusement systems suffer from the drawback that rapid stops and/or rapid changes in movement provide passengers or other loads with undesirable physical or sensory effects. For example, upon a quick stop and fall recovery, the stopping of the ride system is accomplished by a linear spring or pneumatic system that is set for a maximum passenger load. However, for example, the weight of riders for ride systems may vary greatly and existing systems lack the ability to customize the deceleration and stopping for the individual rider or car weight. While the system allows for such a stop to provide a safe deceleration and stop, the deceleration and stop generally lacks realism or comfort.

What is needed is a system and apparatus, such as a ride system and apparatus, that provides a customized damping and physical and/or sensory experience that does not suffer from the drawbacks of the prior art.

SUMMARY OF THE INVENTION

An aspect of an embodiment of the present disclosure includes a damping system for entertainment or amusement ride systems that provides a customized damping and physical and/or sensory experience for entertainment or amusement apparatuses.

A further aspect of the present disclosure includes an automated damping system including a damping device arranged and disposed to provide variable resistance to a load. The variable resistance provides resistance values corresponding to a displacement position of the damping device. The system includes a damping profile generator that calculates a damping profile and a sensor is arranged and disposed to measure one or more damping affecting properties. The sensor provides the one or more damping affecting properties to the damping profile generator. The damping profile provides the variable resistance based upon the one or more damping affecting properties of the load.

A further aspect of the present disclosure includes a ride system. The ride system includes a ride system includes a mechanical arrangement to control the motion of a load. The load includes at least one passenger. The ride system also includes an automated damping system arranged and disposed to provide customized damping to the load. The automated damping system has a damping device arranged and disposed to provide variable resistance to the load. The variable resistance provides resistance values corresponding to a displacement position of the damping device. The automated damping system includes a damping profile generator that calculates a damping profile and a sensor arranged and disposed to measure one or more damping affecting properties. The sensor provides the one or more damping affecting properties to the damping profile generator. The damping profile provides the variable resistance based upon the one or more damping affecting properties of the load.

A further aspect includes a method of providing customized damping of a load. The method includes providing a mechanical arrangement to control the motion of a load. One or more damping affecting properties is measured with a sensor. A value corresponding to one or more damping affecting properties is provided to a damping profile generator. A damping profile corresponding to the one or more damping affecting properties measured is generated with the damping profile generator. A variable resistance is provided to a damping device arranged and disposed to provide variable resistance to the mechanical arrangement, the variable resistance provides a resistance value corresponding to a displacement position of the load. The damping profile is a range of resistances over displacement positions based upon one or more damping affecting properties.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 2 shows a schematic view of a suspension system, according to an exemplary embodiment of the disclosure.

FIG. 3 shows an elevational view of a suspension system, according to an alternate embodiment of the present disclosure.

Wherever possible, the same reference numbers will be used throughout the drawings to represent the same parts.

DETAILED DESCRIPTION OF THE INVENTION

Provided is a damping system for entertainment or amusement ride systems that provide a customized damping and sensory experience for entertainment or amusement apparatuses. Also provided is a ride system. What follows are exemplary embodiments.

An aspect of embodiments of the present disclosure includes a ride system including a mechanical arrangement to control the motion of a load where the load may or may not include at least one passenger. The ride system includes an automated damping system arranged and disposed to provide customized damping to the load.

Another aspect of the present disclosure includes a suspended flying rig system for positioning and orienting a load support within a working space using an arrangement of cables.

Another aspect of the present disclosure includes a suspended flying rig system including a plurality of cables attached to a load, the load having a customized damping effect, provided by input from one or more sensors. In one embodiment, the sensors provide a mass corresponding to the load that provides a customized damping system that permits dampened motion within a three-dimensional working space to the load support. In one embodiment where there is a plurality of suspended flying rig systems, each of the plurality of suspended flying rig systems may include an independent damping profile that may be the same or different than the other suspended flying rig systems.

Figure 1:
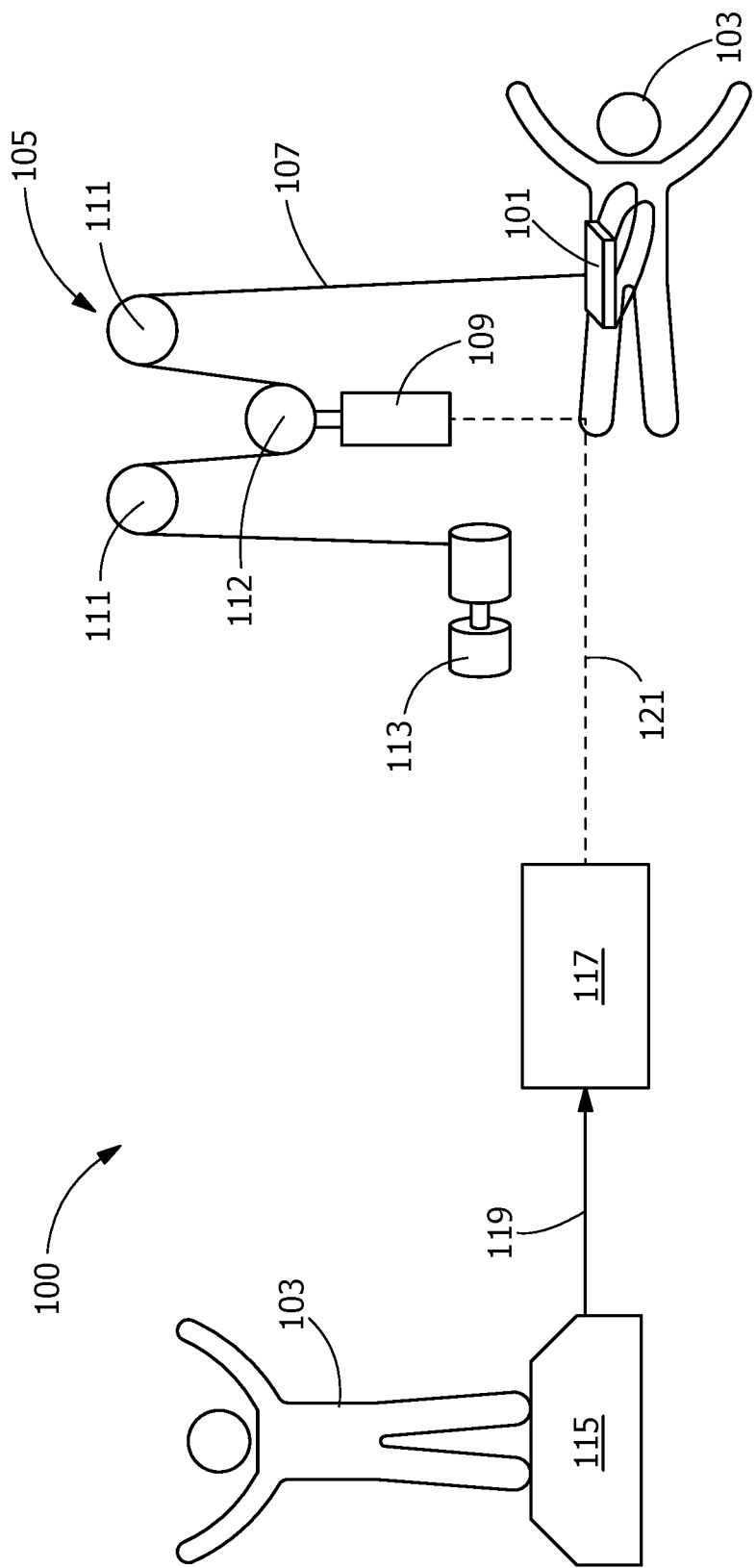
FIG. 1 shows a schematic view of an automated damping system, according to an exemplary embodiment of the disclosure.

FIG. 1 shows an automated damping system 100, according to an embodiment of the present disclosure. The automated damping system 100 connects and supports a suspended load support 101 for carrying a load 103, which may include at least one passenger. In certain embodiments, the load 103 may include seating and a protective cage or enclosure. However, the load 103 that is mountable on or to the suspended load support 101 is not so limited. For example, other embodiments of the load may include cameras, equipment, lighting, personnel, ride vehicles, ride cars or other objects that are desirably positioned and/or oriented. In one particularly suitable embodiment, the load is a human passenger suspended in such a manner to simulate flying or free-fall.

The automated damping system 100 includes a suspension system 105 that suspends load 103 by cable 107. Cable 107 is an elongate support member capable of supporting weight and being stored and driven, for example, on the winch assembly. Suitable structures for use as cable 107 include, but are not limited to, a wire, cable, rope, tape, ribbon, or other structure or lifting media, capable of supporting weight. The cable 107 may be synthetic or non-synthetic material. Suitable materials for cable 107 may be a metal, polymer, carbon fiber, or other suitable high strength material of construction. In other embodiments, the cable 107 includes power or signal wires either integrated into the cable 107, adjacent to the cable 107 or run parallel to the cable 107 in order to provide power and/or control to the camera or other devices present as the load 103. In one embodiment, one or more of the cables 107 are configured for transmitting signals (for example, through electrical signals) to the suspended load support 101, particularly when power and/or control signals are desirable for use with the suspended load support 101 or load 103. For example, in one embodiment, the cable(s) 107 include fiber-optic interiors with a durable exterior (for example, a flexible polymeric coating or a flexible metal coating). For example, power, signal, and utilities can be provided to load 103, when engaged, to power and control a virtual reality "VR" headset for use by the passenger, as well as providing tactile effects, such as blowing air or sprayed water. In one embodiment, one or more of the cables 107 includes an aramid fiber (for example, a polyimide fiber). In one embodiment, one or more of the cables 107 are steel cables. In another embodiment, one or more of the cables 107 are braided Kevlar-jacketed. The cable 107 is connected to the suspended load support 101 by any suitable mechanism. Suitable mechanisms include, but are not limited to, loop and closed-hook mechanisms, connectors guided by magnets for alignment, bolts or other fasteners, and cable splices.

As shown in FIG. 1, the automated damping system 100 includes a mechanical arrangement to manipulate a load. In the embodiment shown in FIG. 1, the mechanical arrangement is suspension system 105 that includes a damping device 109 arranged and disposed via stationary sheaves 111 and a variable sheave 112 to provide variable resistance to suspension system 105. As shown in FIG. 1, stationary sheaves 111 are arranged with one stationary sheave 111 receiving cable 107 from a winch assembly 113 and one stationary sheave 111 receiving cable 107 from the suspended load support 101 and load 103. Variable sheave 112 is between the sheave 111 receiving cable 107 from a winch assembly 113 and the sheave 111 receiving cable 107 from the load 103. The variable sheave 112 is attached to damping device 109 and is permitted to move in a linear direction from the damping device 109, the position of the variable sheave 112 being a displacement position. Damping device 109 provides resistance, including variable resistance to the movement of the variable sheave 112. The linear displacement of the variable sheave 112, or displacement position, is resisted by a variable force generated by the damping device 109. The variable resistance provides resistance values corresponding to a displacement position of suspension system 105. The suspension system 105 may be mounted to any suitable support structure capable of supporting stationary sheaves 111 and the load 103. For example, the plurality of stationary sheaves 111 may be mounted to one or more support structures (see, for example, support structure 511 in FIG. 5).

Load 103 is mounted on a suspended load support 101, which is moved by selective retraction and deployment of cable 107 from the plurality of winch assemblies 113. As shown in FIG. 1, load support 101 includes a backpack-type restraint wearable by a passenger to allow the suspension of the passenger by suspension system 105. By retracted, retracting, retraction, or grammatical variations thereof, it is meant that cable 107 is drawn so that the length of cable 107 suspended is shortened, such as by a plurality of winch assemblies 113. By deployed, deploying, deployment or grammatical variations thereof, it is meant that cable 107 is extended so that the length of cable 107 suspended is increased.

Figure 4:
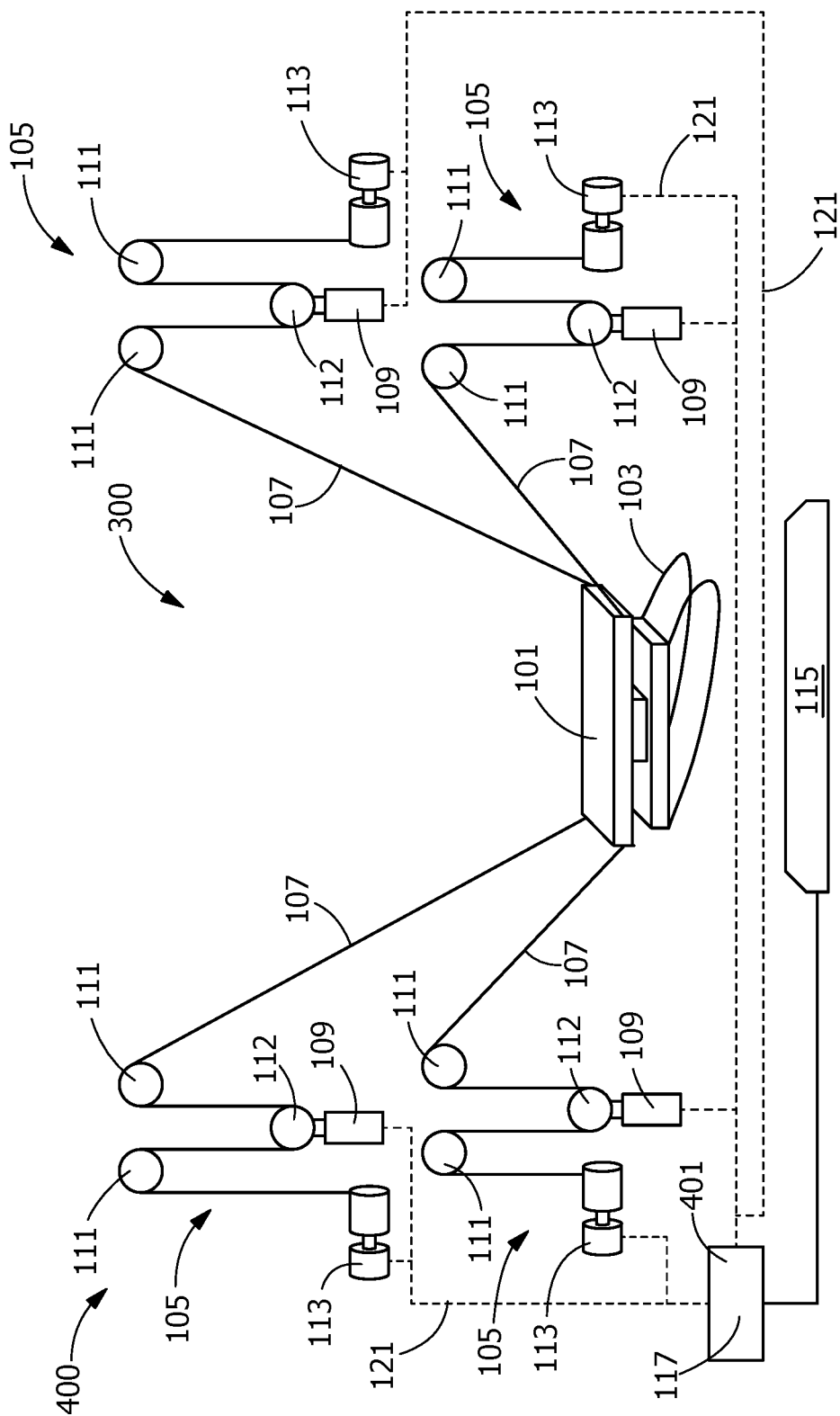
FIG. 4 shows a schematic view of a ride system, according to an exemplary embodiment of the disclosure.
Figure 5:
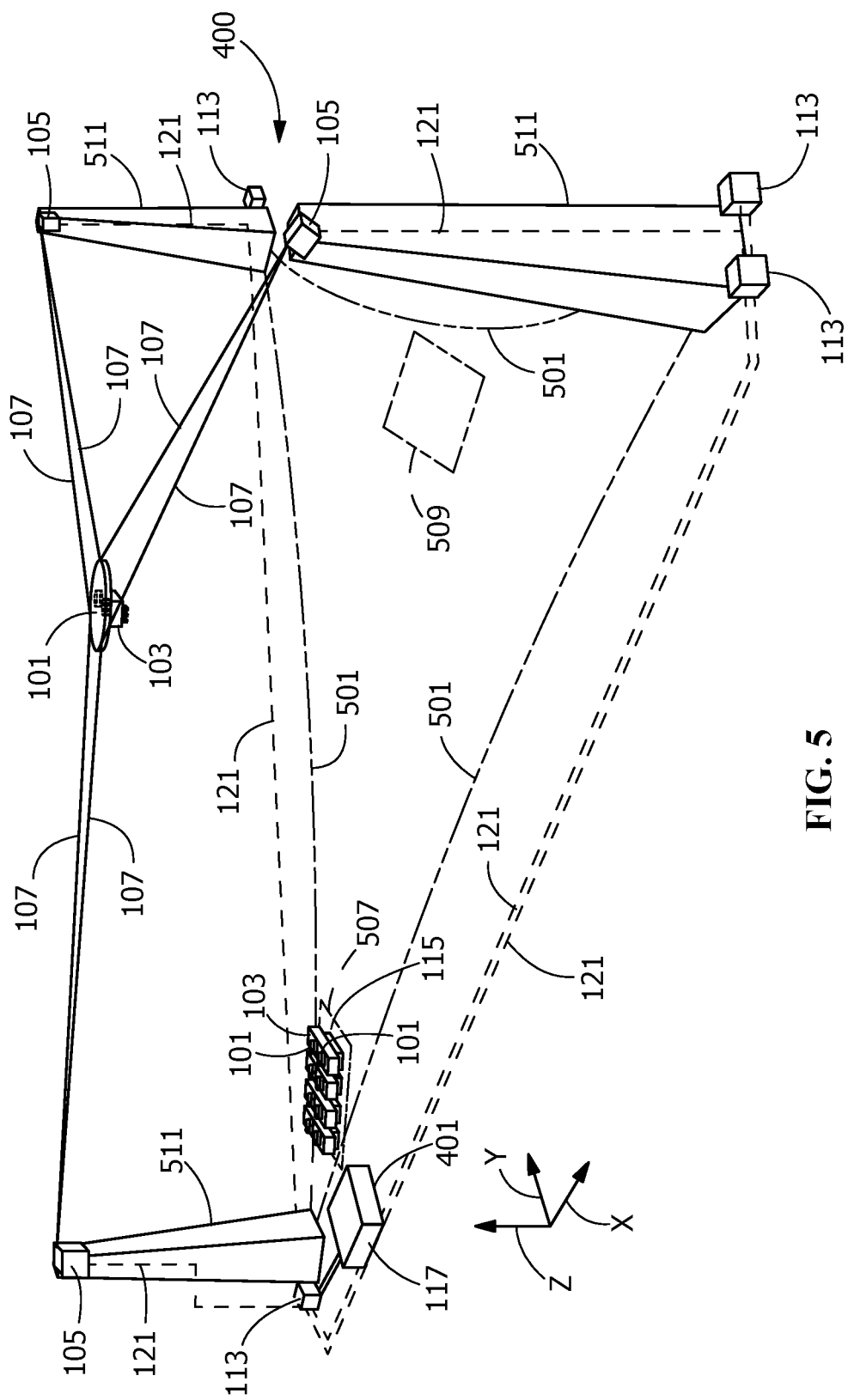
FIG. 5 shows a schematic view of a ride system, according to an alternate embodiment of the present disclosure.

In the embodiment shown in FIGS. 1, 4 and 5, motion of the suspended load support 101 and thereby load 103 is facilitated by deploying or retracting cables 107. Motions, such as pitch, roll and yaw, can be provided by selectively retracting and deploying cable 107 with winch assembly 113 when a plurality of cables 107 are attached to the load support 101 (see, for example, FIGS. 4-5). The motions result as the cables 107 are independently deployed or retracted, causing independent motion in each of the pull directions. The cooperative motion in the pull directions permits a range of motion in a three-dimensional space, for example, with at least six degrees of freedom. Other motions, such as lifting, can be accomplished by selectively retracting cable 107 with winch assembly 113.

A suitable winch assembly 113 is a powered winch or other device capable of retaining and retracting/deploying cable 107. One embodiment of the disclosure includes a winch assembly 113 being a powered winch having a motor, which drives a reel or set of reels which receive, store, drive or otherwise move cable 107. The arrangement of motors and reel can include any suitable arrangement known for powered winches and may include gearing, clutch assemblies, brakes, belts, chains or other structures useful for translating rotation motion from the motor to rotational motion of the reel. In addition, the reel preferably includes a helical groove or similar structure to retain cable 107. Although the above has been described with respect to a motor and reel to move cable 107, other structures may be utilized to provide movement to cable 107, such as linear actuators driving a mechanical advantage or disadvantage system. The amount or length of cable 107 that is suspended may be altered by other methods, such as a non-rotation mechanical system, hydraulic cylinders, or by other actuation devices capable of altering the amount of cable 107 that is suspended. For example, portions of the cable 107 may be folded or redirected to remove a portion of the length that is suspended from the support structure onto which the winch assemblies 113 are attached. Manipulation of the length of cable 107 suspended facilitates motion of the suspended load support 101 attached thereto.

The automated damping system 100 also includes a sensor 115 and a damping profile generator 117 that calculates a damping profile to control the variable resistance of the damping device 109. Devices suitable for use as damping device 107 include, but are not limited to, hydraulic cylinders, pneumatic cylinders or other forms of liquid power cylinders. The sensor 115 may be any suitable device capable of measuring one or more damping affecting properties. Damping affecting properties, as utilized herein, are conditions or properties that alter the potential physical or sensory experience resulting from damped movement. While not so limited, damping affecting properties may include mass of the load, volume of the load, wind speed, equipment temperature, atmospheric temperature, barometric pressure, atmospheric humidity, seismic activity, speed of the object to be dampened, position of the object to be dampened, speed of another object, position of another object, liquid viscosity, gas or liquid pressure, or combinations thereof. For example, sensor 115 may be a mass measuring device, such as a scale, balance, or electronic measurement device, capable of measuring a mass or weight. In other embodiments, sensor 115 may be thermometer, thermocouple, thermistor or other temperature sensing devices. In other embodiments, sensor 115 may be a barometer or similar device for measuring barometric pressure. In still other embodiments, sensor 115 may be a hygrometer or similar device for measuring humidity. In other embodiments, sensor 115 may be a seismometer or similar device for measuring seismic activity. In other embodiments, sensor 115 may be a speed, velocity or position sensors for measuring speed, acceleration or position. In other embodiments, sensor 115 may be a seismometer or similar device for measuring seismic activity. In other embodiments, sensor 115 may be a pressure sensor for measuring liquid or gas pressure. In other embodiments, sensor 115 may be a viscosity sensor for measuring liquid or gas viscosity. While the sensor 115 is shown as a separate device, the sensor 115 may be integrated into the suspension system 105, wherein the damping affecting property is determined from the mass of the load 103, as measured from the suspension of the load 103 via cables 107. The one or more damping affecting properties measured by the sensor 115 are provided to the damping profile generator 117 via signal 119, which calculates a corresponding damping profile for the signal provided. In one embodiment, sensor 115 provides a value corresponding to one or more damping affecting properties to the damping profile generator 117 in real-time. In another embodiment, sensor 115 provides a value corresponding to one or more damping affecting properties to the damping profile generator 117 prior to initiating motion of the load. Signal 119 may be a wired or wireless signal that transmits data corresponding to the one or more damping affecting properties. Control of the damping device 109 is provided by a controller or damping profile generator 117, which sends control signals to the damping device 109 via control line 121. Damping profile generator 117 may be any suitable software or hardware, such as a microprocessor, capable of receiving signals corresponding to the one or more damping affecting properties and generating a damping profile that may be directly provided to one or more devices or may be provided to a controller that provides the control of the devices based upon the damping profile. While control line 121 is shown as a wired connection, any suitable wired or wireless connection that provides control signals, including the damping profile, to the damping device 109 may be utilized. The damping profile provides a variable resistance based upon a damping affecting property, such as the mass of the load 103. While the damping profile is not limited, a suitable damping profile is a correlation between a variable sheave position and a resistance force provided by the damping device 109. The one or more damping affecting properties provided by the sensor 115 are utilized to calculate or select the damping profile. In one embodiment, the damping profile may be a varied force profile that is set empirically based upon a pre-selected look-up based on exemplary inputs. For example, a first custom force profile may be provided for a load having a first lower mass and a second custom force profile that is different than the first custom force profile for a load having a second higher mass. The custom force profile may provide resistance along the displacement that provides a desired sensory experience for a rider (i.e., load). In this embodiment, the customized experience can be provided as a look-up or series of force profiles that correspond to particular load masses.

FIG. 2 shows a schematic view of a mechanical arrangement that is a suspension system 105, according to an embodiment of the present disclosure. As shown in FIG. 2, in response to a load 103 or increased force acting on the load 103, the variable sheave 112 is driven upwards from a first position 201 to a second position 203 in a linear direction 205. The distance that the variable sheave 112 moves is the displacement range 207, where the variable sheave 112 moves along the linear direction 205 through a variety of displacement positions through the displacement range 207. In one embodiment, the load 103 is permitted to drop from a distance, for example in a ride system simulating a free-fall from an aircraft, wherein the arrangement of stationary sheaves 111 permit movement of the variable sheave 112, the variable sheave 112 displacing a linear distance in a direction from the damping device 109. The damping device 109 provides a resistance, which slows the rate of drop by providing an opposing force to the motion from the damping device 109. The amount of resistance provided to oppose the movement of the variable sheave 112 varies based upon a displacement position of the variable sheave 112, according to a damping profile. The damping profile is a schedule of resistance values corresponding to the displacement position and the one or more damping affecting properties. The damping profile provides a resistance force via the damping device 109 and a variable resistance over the displacement positions to provide a customized and desirable sensory effect for the passenger load 103, such as based at least on the measured mass of the load 103. While the displacement position and the displacement range 207 are shown and described with respect to the position of variable sheave 112, the invention is not so limited and may include other displacement measurements corresponding to providing resistance to a moving load 103. While suspension system 105 is shown as vertical damping, any other orientation of system and/or damping may be used. For example, suspension system 105 may include a winch assembly 113 and damping device 109 that is arranged in a horizontal direction or at an angle to horizontal that permits damping at angles other than vertical.

FIG. 3 shows an alternate embodiment of suspension system 105 having a damping device 109, according to an embodiment of the present disclosure. As shown in FIG. 3, moving from the figure on the left to the figure on the right, in response to a load 103 or increased force acting on the load 103, the variable sheave 112 is driven upwards from a first position 201 to a second position 203. The range of motion through which the variable sheave 112 moves is the displacement range 207. The variable sheave 112 moves along the linear direction 205 through a variety of displacement positions along the displacement range 207. As shown in FIG. 3, the damping device 109 is a cylinder arrangement 301 that includes pneumatic cylinders or pneumatic pistons that are connected to variable sheave 112 by pistons 303. Pistons 303 oppose forces provided to cable 107 to the cylinder arrangement 301, which utilizes a controlled amount of compressed air to resist the motion of variable sheave 112. In addition, the damping device 109 includes a position rod 305 attached to the variable sheave 112, which is slidably affixed at a distal end to a fixed rod 307, which extends as variable sheave 112 moves away from cylinder arrangement 301. The position rod 305 generates a signal corresponding to the displacement position of the variable sheave 112 as the position rod 305 slides along fixed rod 307. In one embodiment, precision air valves (not shown) provide compressed air to the cylinder arrangement 301 in a controlled manner to provide a resistive force to the upward motion of variable sheave 112. The displacement position of variable sheave 112 through the displacement range is measured utilizing position rod 305 and fixed rod 307. The displacement position is provided to a controller that provides the compressed air to the cylinder arrangement 301. The amount of compressed air provided to the cylinder arrangement 301 corresponds to the damping profile, which corresponds to the sensed position of the variable sheave 112 and the one or more damping affecting properties. The position of the variable sheave 112 is provided to the controller (see, for example, FIG. 4), which provides the amount of resistance to be provided by the cylinder arrangement 301 in accordance with the damping profile. In one embodiment, the cylinder arrangement includes a pneumatic pressure applied constantly throughout the stroke of the catch mechanism and is not as a one-time pressure value. Based on the damping affecting property sensed, a profile of pressure is cued up for the cylinder arrangement 301, the starting pressure of which is initially applied.

FIG. 4 shows a ride system 400, according to an embodiment of the present disclosure. As shown in FIG. 4, winch assemblies 113 and damping devices 109 are controlled by a controller 401 or other suitable control system. A controller 401 includes one or more microprocessors and graphical user interface that provides individual control to winch assemblies 113 and damping device 109. Controller 401 includes damping profile generator 117 that receives a signal 119 from sensor 115, which measures one or more damping affecting properties. For example, the mass of the load 103 may be measured prior to the initiation of motion or during the initiation of motion by the ride system 400. The damping profile generator 117 creates a damping profile in response to the one or more damping affecting properties measured by sensor 115. Control lines 121 provide signals and/or power to the winch assemblies 113 and damping devices 109 from controller 401. In one embodiment, the winch assemblies 113 and damping devices 109 include control systems having microprocessors that provide control to the damping devices 109 and the winch assemblies 113 in response to a signal from controller 401. In another embodiment, the damping device 109 may receive the damping profile from controller 401 to provide controlled resistance to the downward motion of the load. The arrangement of control lines 121 may include wiring individually run to the winch assemblies 113 and damping devices 109 or may include a daisy-chain arrangement wherein the line includes a single or few branches from which connections to the winch assemblies 113 and damping devices 109 are made. The arrangement of the controller 401 and damping profile generator 117 may also be integrated into a larger control system, such as a show or attraction, where a graphical user interface and series of microprocessors are arranged to provide centralized control of the motion of suspended load support 101. While the ride system 400 is shown as a suspended system that includes vertical damping, any other orientation of system and/or damping may be used. For example, ride system 400 may include a winch assembly 113 and damping device 109 that is arranged in a horizontal direction or at an angle to horizontal that permits damping at angles other than vertical.

FIG. 5 shows a schematic perspective view of an exemplary embodiment of a ride system 400, according to an embodiment of the present disclosure. FIG. 5 shows the load 103 including a plurality of securing arrangements, such as chairs, for moving ride patrons or passengers within a three-dimensional working space defined by interconnected boundary lines 501 extending in the x-y plane, the interconnected boundary lines movable in the z direction to collectively form the three-dimensional working space. Load 103 is a ride vehicle or ride car and optionally includes a protective enclosure or cage (not shown) that may be at least partially transparent to enhance viewability. In one embodiment, as shown in FIG. 5, once suspended load support 101 is lowered to a desired docking position, the suspended load support 101 permits lifting of the load 103. That is, the suspended load support 101 is either brought into abutment with a corresponding surface of load 103 such that load 103 may be releasably secured is placed in a position such that load 103 can be moved in sufficiently close proximity such that load 103 may be releasably secured to the load support 101.

As shown in FIG. 5, the ride system 400 may be used to move the loads 103, such as ride vehicles or ride cars, within the three-dimensional working space. FIG. 5 shows the ride system 400 including an arrangement of the controller 401, control lines 121, and winch assemblies 113 that operate in a manner similar to that shown and described with respect to FIG. 4. In one movement path, load 103 is moved from a first position 507 into three-dimensional space, returning to first position 507. In one embodiment, this movement path may correspond to the system being used as an amusement park ride, in which the starting point and ending point of the ride (and the loads) are the same. In another movement path, load 103 is moved from the first position 507 into the three-dimensional working space to a second position 509. In one embodiment, ride system 400 includes a sensor 115 positioned in a location that permits the sensing of the damping affecting property, such as mass of load 103, prior to lifting of the load 103 and initiating movement. In addition, the controller 401 further includes a damping profile generator 117 that calculates the damping profile. The one or more damping affecting properties that are measured are provided from the sensor 115 to the damping profile generator 117 via control line 121, which calculates a damping profile.

Also shown in FIG. 5, suspension systems 105, according to an embodiment of the present disclosure, present at each of the support structures 511. The suspension systems 105 include the components and operate as the suspension system 105 shown and described with respect to FIG. 2. That is, in response to a load 103 or increased force acting on the load 103, the variable sheave 112 is driven upwards in a the displacement range 207, where the variable sheave 112 moves along the linear direction 205 through a variety of displacement positions through the displacement range 207.

In one embodiment, the load 103 is permitted to drop from a distance, for example, in a ride system simulating a free-fall from an aircraft, wherein each of the suspension systems 105 independently operates such that an arrangement of stationary sheaves 111 permit movement of the variable sheave 112 in each of the suspension system 105, the variable sheave 112 displacing a linear distance in a direction from the damping device 109. The damping device 109 provides a resistance, which slows the rate of drop by providing an opposing force to the motion from the damping device 109. The amount of resistance provided to oppose the movement of the variable sheave 111 varies based upon a displacement position of the variable sheave 111, according to a damping profile. In the arrangement shown in FIG. 5, the damping profile of each of the suspension systems 105 may be the same or different from one another, to provide a customized suspended experience.

In another embodiment, this movement path may correspond to the system being used to transport riders, for example, from a parking lot collection area to the entrance of an amusement park. In another embodiment, this movement path may correspond to transporting riders in a congested urban setting, e.g., from a hotel to an entertainment/dining venue (or vice versa), providing a scenic view of the city between departure and destination points, without the aggravation of traffic. In another embodiment, this movement path may correspond to movement of the load 103 over a waterway or other obstacle preventing conventional overland travel, such as by automobile. In other embodiments, this movement path may correspond to different combinations of vehicles/vessels and/or land-based positions, such as between two (or more) different sea vessels, between one or more land-based position(s) and a sea vessel(s), between one or more land-based position(s) and a flying vehicle(s), such as a hovercraft, helicopter, blimp or other air vehicle capable of independently controlling its position in space (as well as air vehicles incapable of independently controlling its position in space, such as a hot air balloon), between one or more sea vessel(s) and a flying vehicle(s), between one or more land-based position(s), a sea vessel(s) and a flying vehicle(s), or any combination thereof. In one embodiment, the loads may include the movement or transfer of riders and/or cargo, or for rescue missions, such as extracting riders and/or cargo from a land-based position, or from a body of water, or from a flying vehicle. In order for the system to operate as disclosed between only two vehicles/positions, at least one of the vehicles/positions would need to include at least two support structures, such as previously discussed.

As further shown in FIGS. 5, the three support structures 511 are freestanding. For purposes herein, "freestanding", as in "freestanding structure", is intended to mean a structure that is not supported by another object. The term "object" is intended to include another freestanding structure. That is, a tower that may include one or more support cables is a freestanding structure. For example, the support structure 511 may be a structure sufficiently protruding or jutting from the surrounding terrain (erected or natural formation) securable to a sheave/pulley or winch assembly 113 from which cable 107 may be deployed or retracted for use with the system as previously discussed, may be considered a freestanding structure. The support structures 511, such as the towers shown in FIG. 5, are examples of freestanding structures. The winch assemblies 113 may be connected to the support structure 511 by any suitable mechanism. Suitable mechanisms include, but are not limited to, fasteners, interlocking structures, quick-release mechanisms, semi-permanent attachment devices, such as welds, or other attachment devices. Additionally, the support structure 511 may be a non-freestanding structure.

While the above has been described with respect to suspension systems 105 being attached to the support structures 511, other structures may be utilized to guide and suspend cables 107. In another embodiment, one or more sheaves or pulleys may be mounted to a single support structure. The pulleys may be arranged and mounted to support the cable 107 as it is deployed or retracted by winch assembly 113. In another embodiment, the sheaves may be arranged within or on tracks or other guides that physically move the pulleys to different locations on the fly to provide dynamic re-sizing and re-shaping of the working space. Suitable pulleys include conventional pulley structures or other devices capable of rollably or slidably supporting a cable, wire or rope. While the pulleys in this embodiment are preferably free-rolling pulleys, a brake, motor or other rotation-facilitating or retarding device may be provided to pulleys to provide additional control for positioning the suspended load support 101. In these embodiments, the winch assembly 113 may be located at a location some distance from the pulley. In one embodiment, the winch assemblies 113 are located at ground level. In another embodiment, a portion of the winch assemblies 113 are mounted at ground level and a portion of the winch assemblies 113 are mounted on a support structure and cables 107 extend to the pulleys. In yet another embodiment, the winch assemblies 113 are consolidated into a single location and cables 107 extend to the pulleys to allow shorter control lines 121 and easier servicing of the winch assemblies 113.

In one embodiment of the present invention, ride system 400 utilizes a novel ride platform environment, which is the ride platform or load 103 that is in motion relative to real world studio environment (or the fixed outdoor location). Ride passengers wear a display arrangement, such as a virtual reality ("VR") headset worn on the head of ride passenger. In accordance with one aspect of the present disclosure, the ride system includes a harness system or vehicle, wherein this component of the ride system may be, for example, the load 103 or the combination of the suspended load support 101 and load 103. The harness system or ride vehicle is operable to support a ride passenger during a ride event during which the ride vehicle travels along an event path located within a volume. In particular, the event path may include a drop or fall some distance to provide the passenger a sensory feeling of falling. In this type of event, the automated damping system provides a resistance to the fall or drop that corresponds to the weight or mass of the passenger. The ride system additionally includes a display arrangement for displaying a viewing script or VR scenery environment to the ride passenger during a ride event, wherein this component of the ride system may be, for example, the virtual reality sub-system including a headset to be worn on the head of the ride patron. The ride system 400 further includes the motive force assembly, for example, shown and described with respect to FIGS. 1, 4 and 5, operatively connected to the ride vehicle, wherein this component of the ride system may be, for example, comprised of the cables 107, associated winch assemblies 113.

While only certain features and embodiments of the invention have been shown and described, many modifications and changes may occur to those skilled in the art (for example, variations in sizes, dimensions, structures, shapes and proportions of the various elements, values of parameters (for example, temperatures, pressures, etc.), mounting arrangements, use of materials, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. An automated damping system comprising:
a damping device arranged and disposed to provide variable resistance to a load, the variable resistance providing resistance values corresponding to a displacement position of the damping device;
a suspension system for suspending the load, the suspension system including a plurality of cables suspending the load;
a damping profile generator that calculates a damping profile; and
a sensor arranged and disposed to measure one or more damping affecting properties and providing the one or more damping affecting properties to the damping profile generator, the sensor comprising a mass measuring device;
wherein the damping profile provides the variable resistance based upon the one or more damping affecting properties of the load.

2. The system of claim 1, wherein the damping affecting properties include mass of the load.

3. The system of claim 1, wherein the damping device includes a cylinder arrangement arranged and disposed to provide variable resistance to the load.

4. The system of claim 1, wherein damping device is a pneumatic piston.

5. The system of claim 1, wherein the sensor is an independent measuring device.

6. The system of claim 5, wherein the sensor provides a value corresponding to one or more damping affecting properties to the damping profile generator prior to initiating motion of the load.

7. The system of claim 1, wherein the sensor is integrated into the damping device.

8. The system of claim 1, wherein the sensor provides a value corresponding to one or more damping affecting properties to the damping profile generator in real-time.

9. The system of claim 1, wherein the load is a human passenger.

10. The system of claim 1, wherein the sensor is integrated into the suspension system, wherein the mass of the load is directly measured from the suspension of the load.

11. The system of claim 10, wherein the sensor provides the mass of the load to the damping profile generator in real-time.

12. A ride system comprising:
a mechanical arrangement to control the motion of a load, the load including at least one passenger;
the automated damping system arranged and disposed to provide customized damping to the load, the automated damping system comprising:
a damping device arranged and disposed to provide variable resistance to the load, the variable resistance providing resistance values corresponding to a displacement position of the damping device;
a suspension system for suspending the load, the suspension system including a plurality of cables suspending the load;
a damping profile generator that calculates a damping profile; and
a sensor arranged and disposed to measure one or more damping affecting properties and providing the one or more damping affecting properties to the damping profile generator, the sensor comprising a mass measuring device;
wherein the damping profile provides the variable resistance based upon the one or more damping affecting properties of the load.

13. The ride system of claim 12, wherein the damping affecting properties include mass of the load.

14. The ride system of claim 12, wherein the mechanical arrangement includes a suspension system for suspending the load.

15. The ride system of claim 12, wherein the sensor provides the damping affecting properties to the damping profile generator in real-time.

16. A method of providing customized damping of a load comprising:
providing a mechanical arrangement to control the motion of a load, the mechanical arrangement including a suspension system for suspending the load, the suspension system including a plurality of cables suspending the load;
measuring a one or more damping affecting properties with a sensor, the sensor comprising a mass measuring device and the damping affecting properties including mass of the load;
providing a value corresponding to one or more damping affecting properties to a damping profile generator;
generating a damping profile with the damping profile generator corresponding to the one or more damping affecting properties measured;
providing a variable resistance to a damping device arranged and disposed to provide variable resistance to the suspension system, the variable resistance providing a resistance value corresponding to a displacement position of the load;
wherein the damping profile is a range of resistances over displacement positions based upon one or more damping affecting properties.

17. The method of claim 16, wherein the damping device provides resistance according to the damping profile at locations corresponding to displacement, the displacement being measured by a location sensor arranged and disposed to provide a location of the load with respect to the damping device.

* * * * *